US010893169B2

(12) United States Patent
Wayama et al.

(10) Patent No.: US 10,893,169 B2
(45) Date of Patent: Jan. 12, 2021

(54) RELAY APPARATUS, CONTROL METHOD, AND INFORMATION PROCESSING SYSTEM

(71) Applicant: CANON KABUSHIKI KAISHA, Tokyo (JP)

(72) Inventors: Hiroshi Wayama, Kawasaki (JP); Michihei Murayama, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/523,232

(22) Filed: Jul. 26, 2019

(65) Prior Publication Data

US 2020/0045205 A1 Feb. 6, 2020

(30) Foreign Application Priority Data

Jul. 31, 2018 (JP) .................................. 2018-144024

(51) Int. Cl.
*G06K 15/00* (2006.01)
*H04N 1/44* (2006.01)
*G06F 3/12* (2006.01)
*H04N 1/00* (2006.01)

(52) U.S. Cl.
CPC ......... *H04N 1/4433* (2013.01); *G06F 3/1222* (2013.01); *G06F 3/1232* (2013.01); *H04N 1/0048* (2013.01)

(58) Field of Classification Search
CPC .. H04N 1/4433; H04N 1/0048; G06F 3/1222; G06F 3/1232
See application file for complete search history.

(56) References Cited

U.S. PATENT DOCUMENTS

| 2013/0321859 A1* | 12/2013 | Ohara | H04N 1/00244 358/1.15 |
| 2014/0006630 A1* | 1/2014 | Cai | H04L 65/1006 709/227 |
| 2014/0268236 A1* | 9/2014 | Ohara | G06F 3/1224 358/1.15 |

FOREIGN PATENT DOCUMENTS

JP 2007316992 A 12/2007

* cited by examiner

*Primary Examiner* — Moustapha Diaby
(74) *Attorney, Agent, or Firm* — Venable LLP (57) ABSTRACT

A relay apparatus that relays communication between a server which provides a service and a terminal which receives the service causes the terminal to store a setting that can identify, for each service, a piece of transmission target information from the terminal to the server which provides the service, among a plurality of pieces of information that can be provided by the terminal, notifies the terminal of a predetermined service of a plurality of services if an information request corresponding to the predetermined service of the plurality of services is received from the server, receives information identified by the terminal based on the notification and the setting from the terminal, and transfers the information which has been identified to the server.

23 Claims, 9 Drawing Sheets

SERVICE MASTER TABLE — 601

| UUID | SERVICE ID | REQUIRED INFORMATION BLOCK | REGISTRATION DATE AND TIME |
|---|---|---|---|
| sjhdf-8ehaf | S-01 | · COMMON DEVICE TYPE INFORMATION<br>· PRINTING INFORMATION<br>· INK INFORMATION<br>· CLEANING INFORMATION<br>· NETWORK INFORMATION<br>· ERROR INFORMATION | 2011/01/01 |
| 8932h-zxbia | S-02 | · COMMON DEVICE TYPE INFORMATION<br>· PRINTING INFORMATION | 2012/01/01 |
| jn39s-3jhsd | S-03 | · COMMON DEVICE TYPE INFORMATION<br>· INK INFORMATION<br>· CLEANING INFORMATION | 2013/01/01 |

SERVICE REGISTRATION TABLE — 602

| UUID | SERVICE ID | TERMINAL ID | REGISTRATION DATE AND TIME |
|---|---|---|---|
| aabas-32ckj | S-01 | AAA-01 | 2015/01/02 |
| hewu3-sjsdf | S-03 | AAA-02 | 2015/01/03 |
| sdgio-8sdsa | S-03 | CCC-03 | 2015/01/04 |

CLIENT TERMINAL REGISTRATION TABLE — 603

| UUID | TERMINAL ID | TERMINAL INFORMATION | REGISTRATION DATE AND TIME |
|---|---|---|---|
| 5rghb-9kggf | AAA-01 | XXX-XXX-XXX | 2015/01/01 |
| Nc35g-8hxff | BBB-02 | XXX-YYY-YYY | 2015/01/02 |
| Vhdrt-65tyg | CCC-03 | XXX-YYY-ZZZ | 2015/01/03 |

CLIENT TERMINAL - SERVICE LINKING TABLE — 604

| UUID | TERMINAL ID | SERVICE ID | REGISTRATION DATE AND TIME |
|---|---|---|---|
| 675fd-1fssa | AAA-01 | S-01 | 2015/01/02 |
| Maaua-9disa | CCC-03 | S-03 | 2015/01/04 |

FIG. 4

| | |
|---|---|
| SERIAL NUMBER | XXX-YYY-001 |
| DEVICE TYPE NAME | ABC |
| ROM VERSION | Ver1.1.1 |
| SHEET TYPE | NORMAL |
| SHEET SIZE | A4 |
| PRINT COUNT | 1000 SHEETS |
| INK CONSUMPTION AMOUNT | 100ml |
| INK TANK EXCHANGE COUNT | 10 TIMES |
| INDIVIDUAL INK TANK INFORMATION | Ink-abc |
| DATE AND TIME OF LAST CLEANING | 2018/1/1 |
| CLEANING COUNT | 10 TIMES |
| MAC ADDRESS | AA:AA:BB:BB:CC:CC |
| ENCRYPTION SCHEME | AES |
| TERMINAL TEMPERATURE | 30°C |
| ERROR DETAIL INFORMATION | — |

F I G. 5

| DETAIL INFORMATION NAME | BLOCK NAME | SERVICE A TRANSMISSION AVAILABILITY | SERVICE B TRANSMISSION AVAILABILITY | SERVICE C TRANSMISSION AVAILABILITY |
|---|---|---|---|---|
| SERIAL NUMBER | COMMON DEVICE INFORMATION | ○ | ○ | ○ |
| DEVICE TYPE NAME | | | | |
| ROM VERSION | | | | |
| SHEET TYPE | PRINTING INFORMATION | ○ | ○ | × |
| SHEET SIZE | | | | |
| PRINT COUNT | | | | |
| INK CONSUMPTION AMOUNT | INK INFORMATION | ○ | × | ○ |
| INK TANK EXCHANGE COUNT | | | | |
| INDIVIDUAL INK TANK INFORMATION | | | | |
| DATE AND TIME OF LAST CLEANING | CLEANING INFORMATION | ○ | × | ○ |
| CLEANING COUNT | | | | |
| MAC ADDRESS | NETWORK INFORMATION | ○ | × | × |
| ENCRYPTION SCHEME | | | | |
| TERMINAL TEMPERATURE | ERROR INFORMATION | ○ | × | × |
| ERROR DETAIL INFORMATION | | | | |

FIG. 7

| DETAIL INFORMATION NAME | BLOCK NAME | SERVICE A TRANSMISSION AVAILABILITY | SERVICE B TRANSMISSION AVAILABILITY | SERVICE C TRANSMISSION AVAILABILITY |
|---|---|---|---|---|
| SERIAL NUMBER | COMMON DEVICE INFORMATION | ○ | ○ | ○ |
| DEVICE TYPE NAME | | | | |
| ROM VERSION | | | | |
| SHEET TYPE | PRINTING INFORMATION | ○ | ○ | × |
| SHEET SIZE | | | | |
| PRINT COUNT | | | | |
| INK CONSUMPTION AMOUNT | INK INFORMATION | ○ | × | ○ |
| INK TANK EXCHANGE COUNT | | | | |
| INDIVIDUAL INK TANK INFORMATION | | | | |
| DATE AND TIME OF LAST CLEANING | CLEANING INFORMATION | ○ | × | ○ (→ ×) 800 |
| CLEANING COUNT | | | | |
| MAC ADDRESS | NETWORK INFORMATION | ○ | × | × |
| ENCRYPTION SCHEME | | | | |
| TERMINAL TEMPERATURE | | | | |
| ERROR DETAIL INFORMATION | ERROR INFORMATION | ○ | × | × |

FIG. 8

| DETAIL INFORMATION NAME | BLOCK NAME | SERVICE A TRANSMISSION AVAILABILITY | SERVICE B TRANSMISSION AVAILABILITY | SERVICE C TRANSMISSION AVAILABILITY |
|---|---|---|---|---|
| SERIAL NUMBER | COMMON DEVICE INFORMATION | ○ | ○ | ○ |
| DEVICE TYPE NAME | | | | |
| ROM VERSION | | | | |
| SHEET TYPE | PRINTING INFORMATION | ○ | ○ | × |
| SHEET SIZE | | | | |
| PRINT COUNT | | | | |
| INK CONSUMPTION AMOUNT | INK INFORMATION | ○ | × | ○ |
| INK TANK EXCHANGE COUNT | | | | |
| INDIVIDUAL INK TANK INFORMATION | | | | |
| DATE AND TIME OF LAST CLEANING | CLEANING INFORMATION | ○ | × | × |
| CLEANING COUNT | | | | |
| MAC ADDRESS | NETWORK INFORMATION | ○ | × | × |
| ENCRYPTION SCHEME | | | | |
| TERMINAL TEMPERATURE | | | | |
| ERROR DETAIL INFORMATION | ERROR INFORMATION | ○ | × | × |

900: TRANSMIT ONCE AN HOUR
901: TRANSMIT ONCE A DAY AT 0:00

FIG. 9

| DETAIL INFORMATION NAME | BLOCK NAME | SERVICE A TRANSMISSION AVAILABILITY | SERVICE B TRANSMISSION AVAILABILITY | SERVICE C TRANSMISSION AVAILABILITY |
|---|---|---|---|---|
| SERIAL NUMBER | COMMON DEVICE INFORMATION | ○ | ○ | ○ |
| DEVICE TYPE NAME | | ○ | ○ | × |
| ROM VERSION | | | | |
| SHEET TYPE | PRINTING INFORMATION | ○ | ○ | ○ |
| SHEET SIZE | | | | |
| PRINT COUNT | | | | |
| INK CONSUMPTION AMOUNT | INK INFORMATION | ○ | × (TRANSMIT ONCE AN HOUR → TRANSMIT ONCE EVERY 4 HOURS) | × |
| INK TANK EXCHANGE COUNT | | | | |
| INDIVIDUAL INK TANK INFORMATION | | | | |
| DATE AND TIME OF LAST CLEANING | CLEANING INFORMATION | ○ | × | × |
| CLEANING COUNT | | | | |
| MAC ADDRESS | NETWORK INFORMATION | ○ | × | × |
| ENCRYPTION SCHEME | | | | |
| TERMINAL TEMPERATURE | | | | |
| ERROR DETAIL INFORMATION | ERROR INFORMATION | ○ | × | × (TRANSMIT ONCE A DAY AT 0:00) |

1000

RELAY APPARATUS, CONTROL METHOD, AND INFORMATION PROCESSING SYSTEM

BACKGROUND OF THE INVENTION

Field of the Invention

The present invention relates to a technique for restricting information to be provided between apparatuses.

Description of the Related Art

In recent years, services which are provided via a network such as the Internet have increased, and terminals (client terminals) which are capable of connecting to a network have rapidly increased accordingly. Depending on the service, a relay server for managing these terminals is installed, and the service is provided via the relay server. In Japanese Patent Laid-Open No. 2007-316992, there is disclosed that a service-providing-side apparatus will obtain the information of a client terminal via a relay server in such a system.

In a system as described above, it is assumed that a new server which is to provide a new service will be added to an existing system. In a case in which such a new server is to be added, it can be assumed that required information will also be different if a different service is to be offered. However, in the system disclosed in Japanese Patent Laid-Open No. 2007-316992, the addition of a new service is not considered, and information cannot be provided appropriately to the service-providing-side apparatus.

SUMMARY OF THE INVENTION

The present invention provides a technique that can provide, for each service, appropriate information to a provider of the service.

According to one aspect of the present invention, there is provided a relay apparatus that relays communication between a server which provides a service and a terminal which receives the service, the apparatus comprising: a storage unit configured to cause the terminal to store a setting that can identify, for each service, a piece of transmission target information from the terminal to the server which provides the service, among a plurality of pieces of information that can be provided by the terminal; and a transfer unit configured to notify the terminal of a predetermined service of a plurality of services if an information request corresponding to the predetermined service of the plurality of services is received from the server, to receive information identified by the terminal based on the notification and the setting from the terminal, and to transfer the information which has been identified to the server.

Further features of the present invention will become apparent from the following description of exemplary embodiments (with reference to the attached drawings).

BRIEF DESCRIPTION OF THE DRAWINGS

The accompanying drawings, which are incorporated in and constitute a part of the specification, illustrate embodiments of the invention, and together with the description, serve to explain the principles of the invention.

DESCRIPTION OF THE EMBODIMENTS

An exemplary embodiment(s) of the present invention will now be described in detail with reference to the drawings. It should be noted that the relative arrangement of the components, the numerical expressions and numerical values set forth in these embodiments do not limit the scope of the present invention unless it is specifically stated otherwise.

That is, some or all of the technical features to be described may be replaced by another arrangement that can implement similar technical features. For example, a plurality of functional blocks or steps may be integrated into a single functional block or a single step of a method, or a single functional block or a single step of a method may be divided into a plurality of functional blocks or a plurality of steps of a method. In addition, at least some of the functional blocks or the steps of a method may be omitted as needed.

System Arrangement

Figure 1:
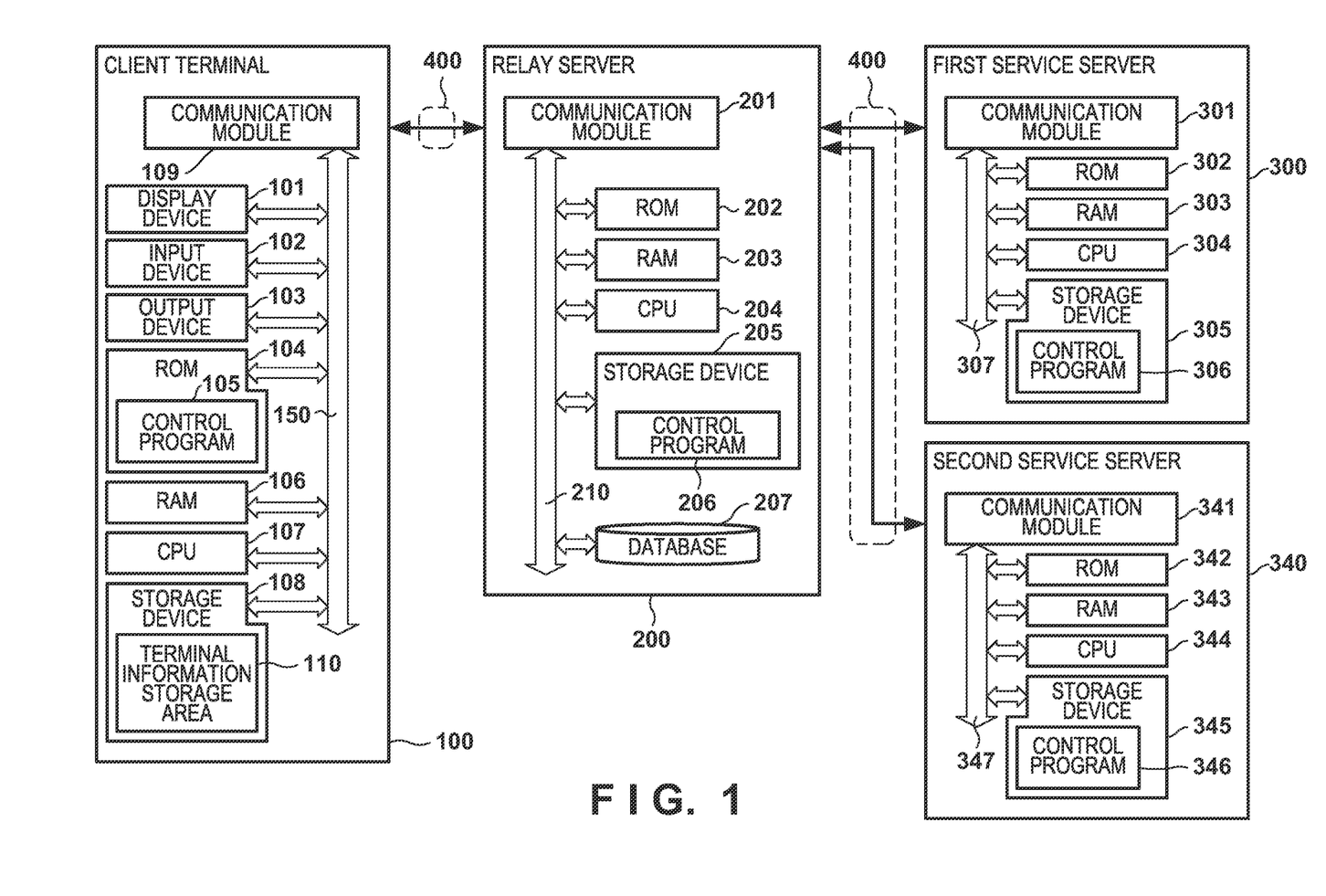
FIG. 1 is a block diagram showing an example of the arrangement of an information processing system.

FIG. 1 shows an example of the arrangement of an information processing system according to the embodiment. The information processing system is formed by a client terminal 100, a relay server 200, a first service server 300, and a second service server 340. Note that although FIG. 1 describes a case in which one client terminal 100 and one relay server 200 are present, two or more apparatuses may be present for each of these apparatuses. Note that in a case in which there are a plurality of client terminals 100 or a plurality of relay server 200, the apparatuses may be apparatuses that execute identical processing operations or may be apparatuses that execute different processing operations from each other. In addition, although FIG. 1 exemplifies a case in which there are two service servers, that is, the first service server 300 and the second service server 340, there may be one service server or three or more service servers. Note that the plurality of service servers may provide identical services or provide services different from each other.

The client terminal 100 is terminal used by a user, and each of the first service server 300 and the second service server 340 is a server that provides a predetermined service to the user. The relay server 200 is a relay apparatus that relays communication executed in relation to a service between the client terminal 100 and the first service server 300 or the second service server 340. That is, the client terminal 100 connects to the relay server 200, the relay server 200 connects to the first service server 300 or the second service server 340, and the relay server 200 relays the communication between the client terminal 100 and one of these service servers. As a result, the user can receive the service provided from the first service server 300 or the second service server 340 via the client terminal 100. Note that the relay server 200 can be formed by, for example, a server group that shares and executes a plurality of functions. In this case, for example, the server group is connected to a local area network which is not visible from the client terminal and the service servers, and the relay server 200 (server group) can be arranged so that it will be recognized as a single apparatus by the client server and the service servers. In a similar manner, the service servers may be formed by a plurality of server groups.

The client terminal 100 and the relay server 200 are connected to each other via a network 400. In one example, the client terminal 100 connects to a wireless LAN access point on the network 400 and connects to the relay server 200 via this access point. Also, there may be one or more routers between the access point and the relay server 200. That is, in the communication path between the client terminal 100 and the relay server 200, one or more apparatuses can be included between these apparatuses. Note that the client terminal 100 may form a wired connection with a router on the network 400. The client terminal 100 and the relay server 200 may also be directly connected to each other. In this manner, the client terminal 100 and the relay server 200 can be connected in an arbitrary form. Note that a similar arrangement can be made for the connection between the relay server 200 and the first service server 300 and the second service server 340.

In this embodiment, the client terminal 100 transmits, in response to a request from each of the service servers (the first service server 300 and the second service server 340), information to each service server via the relay server 200. Conventionally, for example, when a new service server is added, the information of a client terminal required by the new service server could not be appropriately provided to this new service provider in some cases. It may be considered that the simplest method, in this case, is to provide every piece of information held by the client terminal to the new service server. However, this case can cause an information leakage to occur due to information unrelated to the service being exchanged or increase the load of the relay server or the network by increasing unnecessary communication. Hence, in this embodiment, the relay server 200 will determine the contents to be transmitted to the service server from the information of the client terminal 100 depending on the request of the service server. This will allow only appropriate information to be provided from the client terminal 100 to the service server and prevent unnecessary information from being exchanged. In addition, by preventing the exchange of unnecessary information, it is possible to reduce the load of the relay server 200 and the network and suppress the cost required to maintain the corresponding facilities.

The arrangement of each apparatus will be described next.

The client terminal 100 is formed by, for example, a display device 101, an input device 102, an output device 103, a ROM 104, a RAM 106, a CPU 107, a storage device 108, and a communication module 109. In one example, these devices are all connected to each other by an electrical communication bus 150. Note that ROM, RAM, and CPU are acronyms of read only memory, random access memory, and central processing unit, respectively. Note that in one example, the ROM 104 stores a control program 105, and the storage device 108 includes a terminal information storage area 110.

The display device 101 is a lamp that displays information by emitting a light pattern or a display that displays information by using a screen. The display device displays information obtained as a result from an input made to the client terminal 100 by the user, information obtained as a result of executing various kinds of processing, and the like. Note that the display device 101 may include a loudspeaker and a vibration member so that, instead of or in addition to a visual output, various kinds of information outputs, for example, an audio output such as a voice and a vibration output can be performed.

The input device 102 is formed by, for example, a keyboard, a pointing device (mouse), a touch pad, and the like. The input device accepts a user operation and loads an instruction indicating the user operation into the client terminal 100. Note that the input device 102 may have any kind of apparatus arrangement as long as it can accept a user operation and a user instruction. For example, the input device 102 may be a microphone that obtains a user instruction by voice, a camera that obtains a user instruction in accordance with the movement of the user by capturing the user's movement, a sensor that detects that the client terminal 100 has been shaken, or the like. In addition, the display device 101 and the input device 102 may be implemented as a single device by using, for example, a touch panel. Furthermore, the input device 102 may be a scanner and arranged to load, into the client terminal 100, a result obtained by reading an original by using a scan function.

The output device 103 outputs a resultant product of the instruction input by the input device 102. The output device 103 is, for example, a printing apparatus that discharges ink onto a print medium (for example, paper) and outputs the print medium on which an ink image is formed as the resultant product. The output device 103 is also, for example, an interface which connects to an external storage device and can cause the external storage device to accumulate the resultant product by outputting the resultant product to the external storage device. An output other than these may also be performed by the output device 103.

The ROM 104 is a nonvolatile memory and hold, for example, program codes (for example, that have undergone binary translation) to be executed by the client terminal 100. The program codes include the control program 105. The control program 105 is, for example, a program for controlling the entire client terminal 100 (the display device 101, the input device 102, the output device 103, the RAM 106, and the communication module 109). For example, the communication module 109 is controlled by the control program 105 being executed by the CPU 107, and signal exchange processing is executed in the communication module 109 under this control. The RAM 106 is a volatile memory and stores temporary information. The CPU 107 executes various kinds of control such as the control of the entire client terminal 100 and the like. The CPU 107 reads out, for example, the control program 105 from the ROM 104, loads the control program to the RAM 106, and executes various kinds of control by using the RAM 106 as a work space. Note that the CPU 107, the ROM 104, and RAM 106 are merely examples of a processor and memories, and a processor and memory arrangement other than this may be used. In addition, for example, at least some of the processing operations may be executed by using dedicated hardware such as an ASIC (Application Specific Integrated Circuit), an FPGA (Field Programmable Gate Array) which is set to execute predetermined processing in advance, or the like. The storage device 108 is a device for storing data, and writing and reading of the storage contents can be performed by the CPU 107. The terminal information storage area 110 is formed in the storage device 108. The terminal information storage area 110 stores information held by the client terminal 100. The communication module 109 is a functional unit for the client terminal 100 to communicate with an external apparatus (for example, the relay server 200).

In the client terminal 100, in a case in which the client terminal 100 is, for example, an inkjet printing apparatus, the display device 101 will display, to the user, information such as the paper size setting, setting to determine color printing or monochrome printing, and the like. The user will use the input device 102 to make the print settings of the client terminal 100, the CPU 107 will control the output device 103 by executing a program stored in the ROM 104, and the output device 103 outputs a printed product. Note that although the terminal information storage area 110 stores information related to the client terminal 100 such as the serial number, the device type name, and the like of the client terminal 100, it also stores information related to printing when the client terminal 100 is a printing apparatus. For example, the terminal information storage area 110 stores the number of times printing was executed by the client terminal 100 (the total output sheet count), ink consumption amount, date and time of an inkjet printhead cleaning operation, the cleaning operation count, network information, and the like.

The relay server 200 is formed by, for example, a communication module 201, a ROM 202, a RAM 203, a CPU 204, a storage device 205, and a database 207. In one example, these devices are all connected to each other by an electrical wiring bus 210. The relay server 200 uses, for example, a general-purpose server, and is formed to execute the following processing to be described by causing the CPU 204 to use the RAM 203 to execute a control program 206 stored in the storage device 205. Note that the database 207 stores user information to be read/written by the relay server 200 and information necessary to provide a service.

The first service server 300 is formed by, for example, a communication module 301, a ROM 302, a RAM 303, a CPU 304, and a storage device 305. In one example, these devices are all connected to each other by an electrical wiring bus 307. In a similar manner, the second service server 340 is formed by a communication module 341, a ROM 342, a RAM 343, a CPU 344, and a storage device 345. In one example, these devices are all connected to each other by an electrical wiring bus 347. The first service server 300 is formed by, for example, a general-purpose server, and is formed to provide a first predetermined service by causing the CPU 304 to use RAM 303 to execute a control program 306 stored in the storage device 305. In a similar manner, the second service server 340 is formed by, for example, a general-purpose server, and is formed to provide second predetermined service by causing the CPU 344 to use the RAM 343 to execute a control program 346 stored in the storage device 345.

The network 400 is, for example, one of the Internet, an intranet, a LAN, a WAN, a telephone line, a dedicated digital line, an ATM, a frame relay line, a cable TV line, wireless data broadcasting line, and the like or a combination of these networks. Note that these are merely examples, and a network other than these may be used. Note that the network 400 may be either a wired network or a wireless network, and it may be arranged so that, for example, a partial section is formed by a wired network and the remaining section is formed by a wireless network. For example, between the client terminal 100 and the relay server 200, the client terminal 100 can connect to a wireless LAN router, and the wireless LAN router can connect to the relay server 200 by a wired line.

Procedure of Processing

The procedure of processing according to the embodiment will be described next. In this processing, each of the client terminal 100, the first service server 300, and the second service server 340 executes registration processing to the relay server 200. The relay server 200 divides the information that can be provided by the client terminal 100 into a plurality of blocks based on the type of the divided information, and sets, for each block, whether the information can be provided from the client terminal 100 to each service server. Note that each block includes at least one information element.

Figure 2:
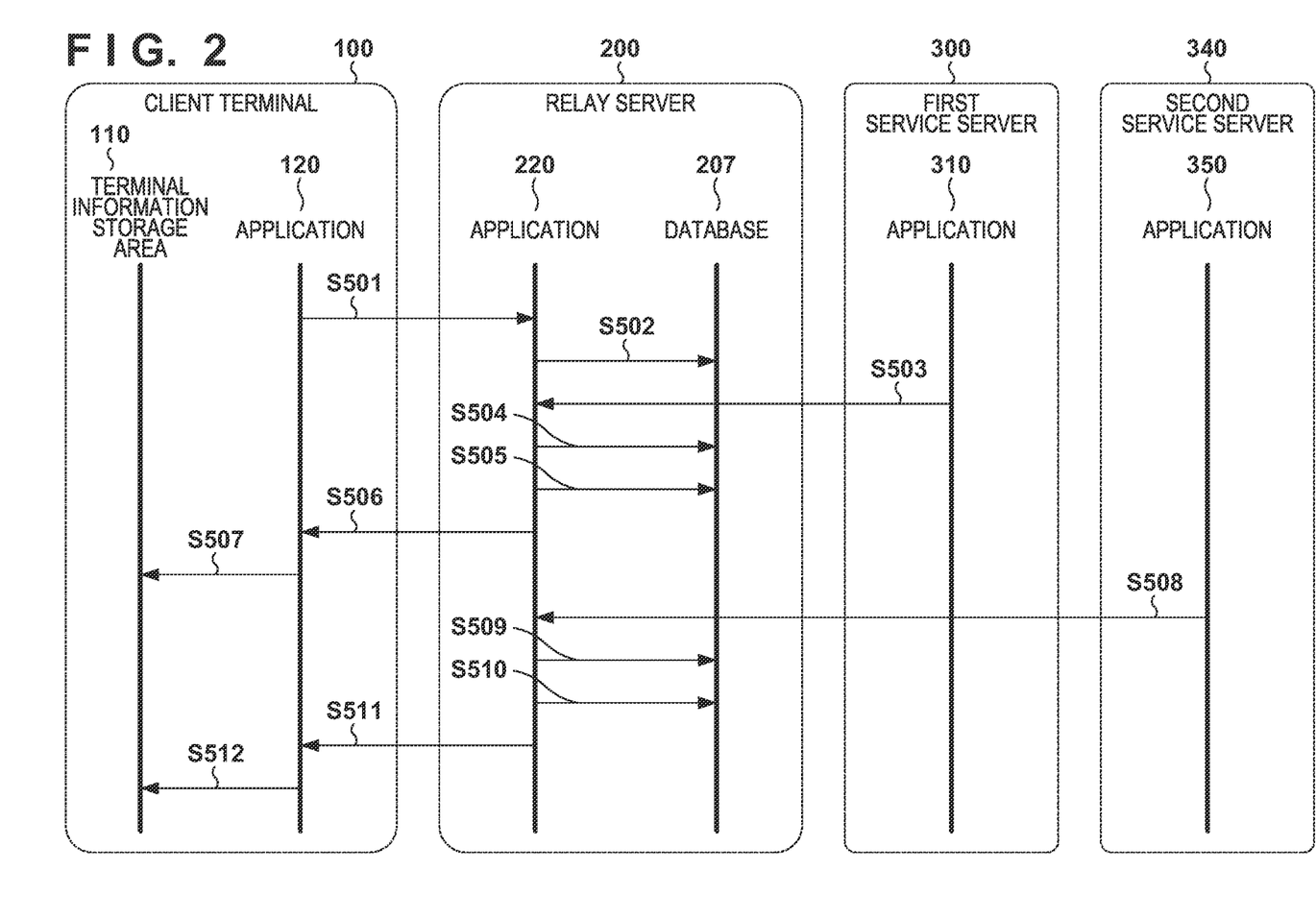
FIG. 2 is a sequence chart showing an example of the procedure of information registration processing.
Figure 3:
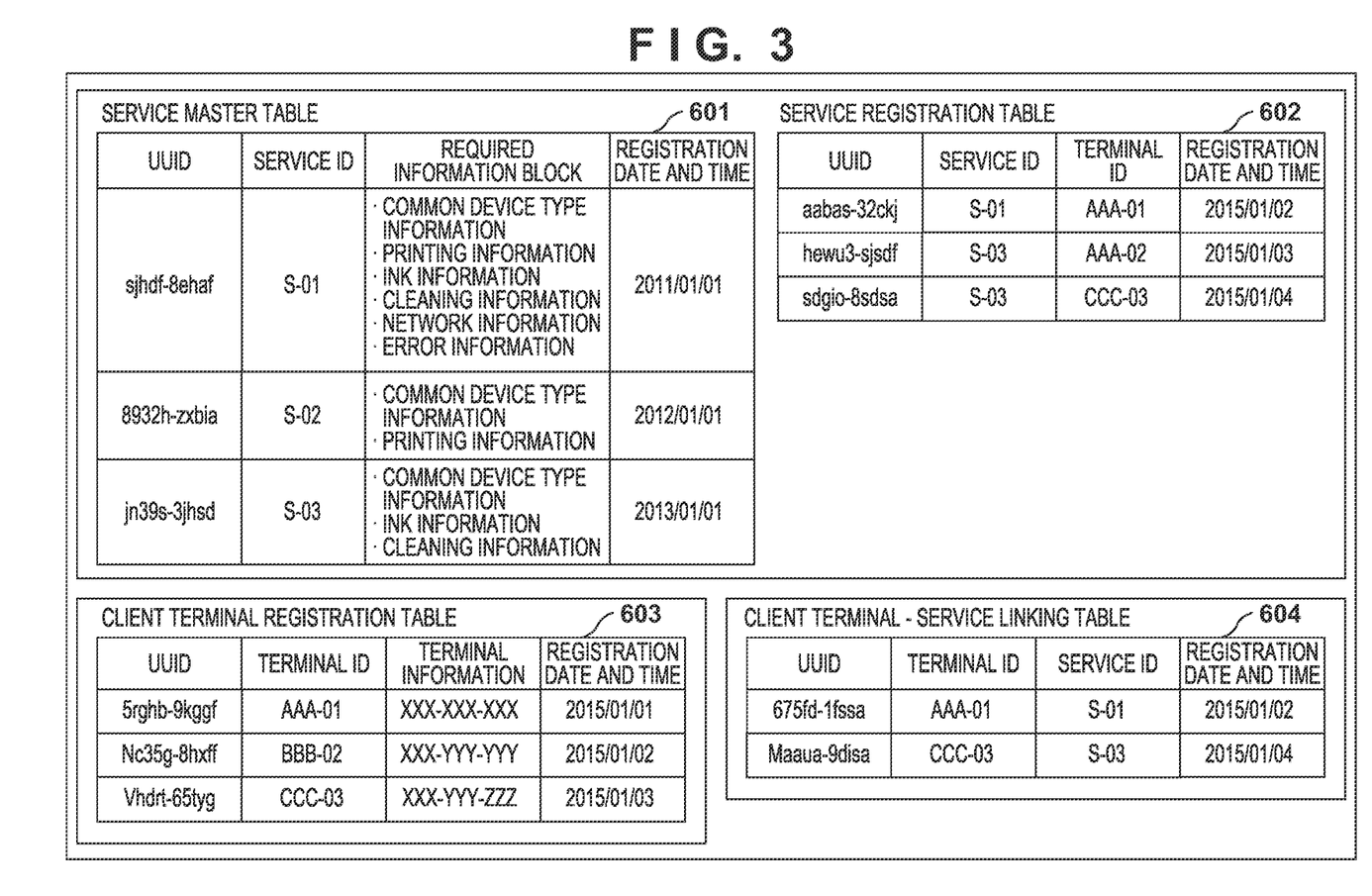
FIG. 3 is a view showing an example of data stored in a database of a relay server.

FIG. 2 shows an example of the procedure of this processing. In this processing, first, an application 120 which is installed in the client terminal 100 transmits a request for registration processing to the relay server 200 (S501). Upon receiving this request, the relay server 200 generates information of the client terminal 100 and registers the information in the database 207 (S502). FIG. 3 shows an example of information registered in the database 207 of the relay server 200 in this case. The information of the client terminal 100 is managed by, for example, a table such as a client terminal registration table 603 shown in FIG. 3, and a new record is generated by the registration processing. The client terminal registration table 603 includes, as a unique key, a unique character string (UUID [universally unique IDD]) which is generated at the registration of each record and has almost no possibility of overlap. In addition, the client terminal registration table 603 can include, in a format associated with each UUID, identification information (terminal ID) unique to the client terminal 100, terminal information describing detailed information of the terminal, and the registration date and time. Note that, for example, the client terminal registration table 603 may not hold the terminal information and the registration date and time information, and may further include information other than these pieces of information. That is, as long as identification information that can uniquely identify the client terminal 100 is held, the client terminal registration table 603 may not include other pieces of information or may include various kinds of optional information.

Next, an application 310 of the first service server 300 makes a request to the relay server 200 for the registration processing of the service and the terminal ID of the terminal which is to receive the service (S503). Upon receiving this request, the relay server 200 generates information associating the service and the terminal ID designated by the first service server 300 and registers the generated information in the database 207 (S504). The relay server 200 registers this information in the database 207 in a format such as a service registration 602 as shown in FIG. 3 in this case. The service registration 602 includes, with respect to each UUID as a unique key, the unique identification information (service ID) of a service to be provided and the terminal ID of the client terminal 100 which is to receive the service. Note that the service registration 602 may also optionally include, for example, the information of the date and time at which the record was registered.

The relay server 200 associates and holds, in advance in a service master table 601, the service ID and the information (required information block) that needs to be provided to each service server with respect to each UUID as a unique ID. Note that the service master table 601 may optionally include the information of the date and time at which the record was registered. In a required information block column, information requested by a service server which is to execute a corresponding service is shown for each block that is obtained by dividing the information that can be provided by the client terminal 100 based on type of the information or the like. When a new service is registered such as the addition of a new service server or the like, the relay server 200 registers a record corresponding to the new service in the service master table 601.

Figure 4:
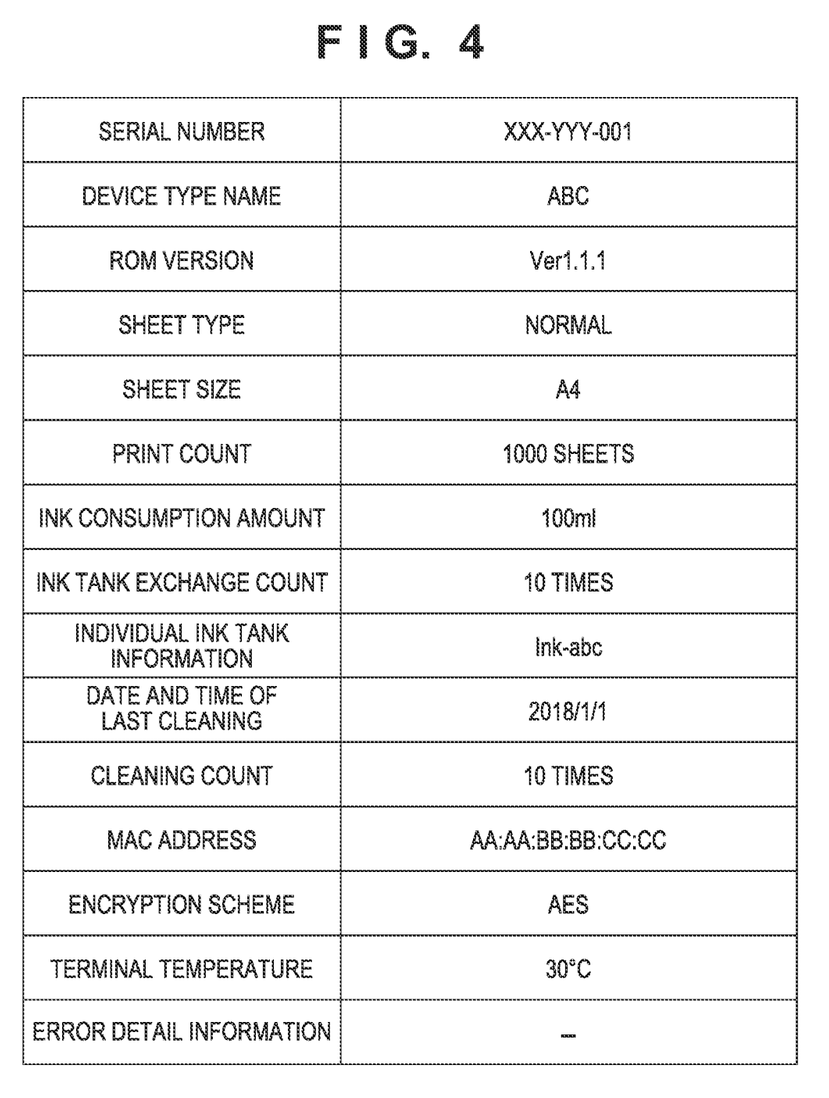
FIG. 4 is a table showing a data structure stored in a terminal information storage area of a terminal apparatus.
Figure 5:
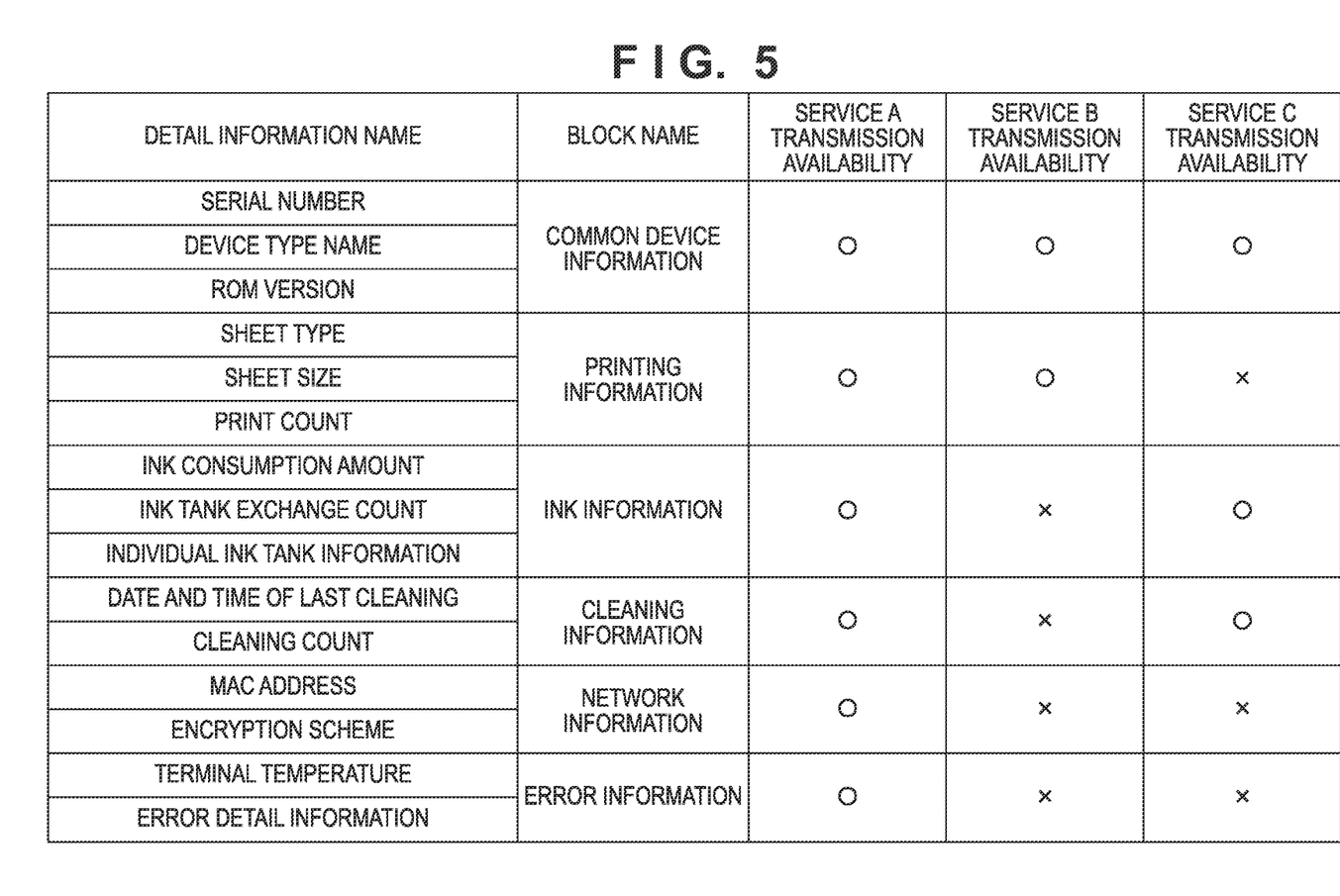
FIG. 5 is a view showing an example of a table that defines transmission permitted information for each service.

FIG. 4 shows an example of a table of information that can be provided by the client terminal 100. The information that can be provided by the client terminal 100 includes, in one example, the serial number, the device type name, and the version of the ROM. In a case in which the client terminal 100 is a printing apparatus, this information will include the sheet type, the sheet size, the print count, the ink consumption amount, the ink tank exchange count, the individual ink tank information, the date and time of the last cleaning operation, and the cleaning count. This information can also include the MAC address of the communication module 109 and the encryption information at the time of communication as the communication information, and include the terminal temperature and the error detail information as the information indicating the status, such as whether it is in an abnormal state or the like, of the client terminal 100. Subsequently, these pieces of information are divided into information blocks in accordance with, for example, the type of each piece of information. The division of the information into these blocks is performed, for example, in the manner shown in FIG. 5. In the example of FIG. 5, the serial number, device type name, the version of the ROM are put together into a single block as common device information. This common device information can be a block that includes the minimum information necessary regardless of the service. Also, the sheet type, the sheet size, and the print count are put together into a single block as the printing information, and the ink consumption amount, the ink tank exchange count, and the individual ink tank information are put together into a single block as the ink information. In addition, the date and time of the last cleaning operation and the cleaning count are put into a single block as the cleaning information related to the cleaning of the inkjet printhead. The printing information, the ink information, and the cleaning information exemplify a case in which the client terminal 100 is an inkjet printer. However, this is merely an example. For example, these pieces of information can be replaced with information of the use history of the client terminal 100 in correspondence with each function of the client terminal 100. The MAC address and the encryption information are put into a single block as the network information, and the terminal temperature and the error detail information are put into a single block as the error information. Note that other than these pieces of information, various kinds of information such as information unique to the hardware of the client terminal 100, information related to the use history of the user of the client terminal 100, and the like can be used. At the time of the registration of the client terminal 100, the relay server 200 can obtain, for example, the device information or the like of the client terminal 100 and obtain a list of the information that can be provided by the client terminal 100 based on the obtained information.

Referring to the service master table 601 of FIG. 3, it is shown that information defined by the required information block is to be provided to each service server that is to provide the service of the corresponding service ID. For example, an information block including the common device information, the printing information, the ink information, the cleaning information, the network information, and the error information is provided to the service server which is to provide a service whose service ID is "S-01". An information block including the common device information and the printing information is provided to the service server which is to provide a service whose service ID is "S-02". An information block including the common device information, the ink information, the cleaning information is provided to service server which is to provide a service whose service ID is "S-03". When setting whether to allow the transmission of each piece of information to the client terminal 100, the relay server 200 refers to this service master table 601.

Next, the relay server 200 searches for, among the records registered in the client terminal registration table 603, a record including the terminal ID of the record registered in the service registration 602 in S504. If a record including the terminal ID of the record registered in S504 is discovered, the relay server 200 associates the discovered terminal ID with the service ID registered in S504 and stores the associated information in a client terminal-service linking table 604 (S505). As a result, the client terminal 100 and the service to be provided are associated. Note that in the client terminal-service linking table 604, the terminal ID and the service ID are registered as attribute values with respect to a new UUID as a unique key. Note that the client terminal-service linking table 604 may include other pieces of information such as the information of the registration date and time and the like. The preparation to receive the service provided from the first service server 300 is completed at the stage in which the client terminal 100 is registered in the client terminal-service linking table 604. Note that if a record including the terminal ID of the record registered in S504 is not discovered, the relay server 200 will stand by for the terminal ID of the client terminal 100 to be registered.

After registration of information to the client terminal-service linking table 604 has been completed, the relay server 200 transmits, to the client terminal 100, a request to designate the information to be transmitted (S506). Note that, for example, in this request, the relay server 200 can transmit, together with the information to designate the information block to be transmitted, information such as the service ID or the like to designate the service. In response to this request, the client terminal 100 makes, for each designated service in the terminal information storage area 110, the transmission permission/prohibition setting of each information-block which was obtained by dividing the information in accordance with a predetermined division method as described above (S507).

In addition, processes similar to those of S503 to S507 are performed for the service provided by the second service server 340. That is, an application 350 of the second service server 340 makes a request, to the relay server 200, for the registration processing of the service and the terminal ID to receive the service to be provided (S508). Upon receiving this request, the relay server 200 generates information to associate the terminal ID and the service designated by the second service server 340 and registers the generated association information in the database 207 (S509). Subsequently, the relay server 200 searches for a record including the terminal ID of the record registered in S509, associates the terminal ID of the client terminal 100 with the service ID, and stores the resultant information in the client terminal-service linking table 604 (S510). After registration of information to the client terminal-service linking table 604 has been completed, the relay server 200 transmits, to the client terminal 100, a request to designate the information block to be transmitted to the second service server 340 (S511). Subsequently, in response to this request, the client terminal 100 makes the transmission permission/prohibition setting of each information block in the terminal information storage area 110 (S512).

Note that in FIG. 2, although the processing is executed in the order of the information registration of the client terminal 100, the information registration of the first service server 300, and the information registration of the second service server 340, the present invention is not limited to this. For example, the information registration of one of the service servers may be executed in advance, and the information registration of the client terminal 100 may be performed after this. Also, the information registration of the second service server 340 may be executed before the first service server 300. In addition, the processes of S507 and S512 may be executed together as a whole after, for example, the completion of the information registration of the second service server 340. That is, the transmission permission/prohibition setting of the information block need not be executed immediately after the client terminal 100 and a service have been associated, and it may be set so that the transmission permission/prohibition setting of the information block will be executed at, for example, a predetermined cycle. In addition, in a case in which the information registration of each service server is performed before the information registration of the client terminal 100, the association of the client terminal 100 and the service is performed in accordance with the information registration of the client terminal 100. Hence, the transmission permission/prohibition setting of the information block can be performed at a timing immediately after the information registration of the client terminal 100.

The client terminal 100 is set to hold information as shown in FIG. 5 in the terminal information storage area 110 based on the settings made in S507 and S512. In FIG. 5, "◯" indicates a state in which transmission is permitted, and "x" indicates a state in which transmission is prohibited. By referring to the information indicated in FIG. 5, the client terminal 100 can identify the information to be the transmission target in accordance with the type of service. For example, assume that a service A provided by the first service server 300 is a service that monitors the use status of the client terminal 100 and performs maintenance as needed. The information required for the provision of this service can be all of the pieces of information (the common device information, the printing information, the ink information, the cleaning information, the network information, and the error information). In this case, a setting permitting the transmission of all of the pieces of information is made for the service A. Assume also that a service B provided by the second service server 340 is a service that provides another service (for example, a service that gives, to a user with a large print count, "points" which can be used to purchase a product of the distributor of the client terminal 100 or the like) to the user in accordance with the print count. In this case, since it is sufficient for the service B to be able to obtain only the common device information and the printing information, the transmission is permitted for the common device information and the printing information, and transmission is prohibited for information blocks other than this. Assume also that a service C provided by a service server (not shown) is a service for monitoring the ink consumption status, predicting the timing at which the ink will be depleted, and automatically delivering the ink to the user. It is sufficient for this service C to be able to obtain the common device information, the ink information, and the cleaning information. Hence, the transmission of the common device information, the ink information, and the cleaning information is permitted for the service C, and the transmission of other information blocks is prohibited. The information shown in FIG. 5 includes, for example, the service ID indicated in FIG. 3, and the type of service in FIG. 5 is discriminated by the service ID.

Note that information as shown in FIG. 5 is information that is to be stored as electronic data in the terminal information storage area 110 which is formed by a hard disk, a nonvolatile memory, or the like. For example, transmission permission/prohibition information corresponding to a service is represented as a bit string of a predetermined region. For example, it can be represented so that if "1" is a transmission permission, "0" is a transmission prohibition (or vice versa). In one example, pieces of information such as "111111" indicating the information related to the service A, "110000" indicating information related to the service B, and "101100" indicating the information related to service C in FIG. 5 can be stored the in the terminal information storage area 110. Note that in a case in which the common device information is to be included in the notification of every service, the bit corresponding to the common device information may be omitted. This is because it is obvious that this bit will be "1" in the information of every service.

Figure 6:
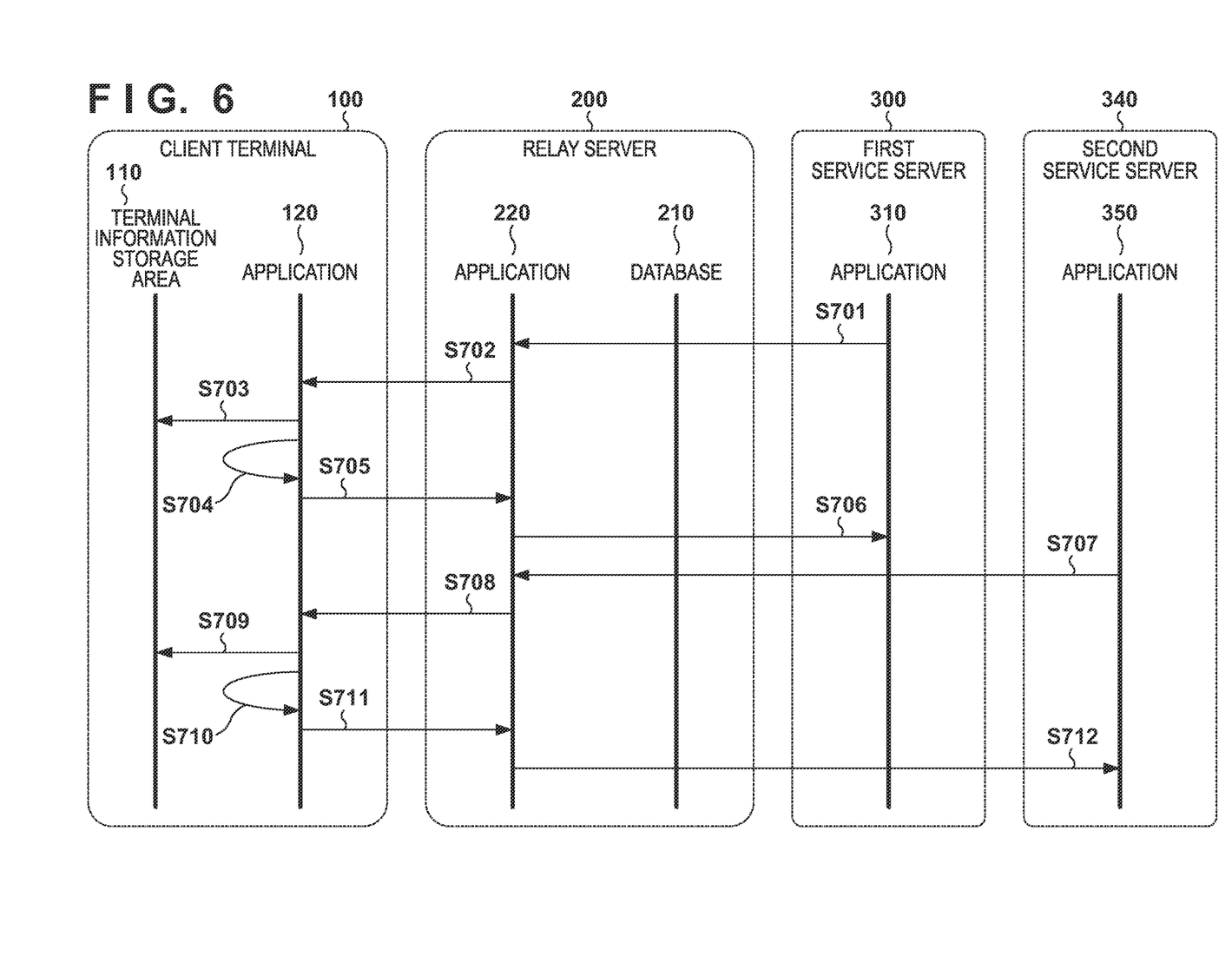
FIG. 6 is a sequence chart showing the procedure of information provision processing.

The procedure of processing in which a piece of information that has undergone the transmission/prohibition setting in accordance with the request of each service server is transmitted from the client terminal 100 to the service server via the relay server 200 will be described next with reference to FIG. 6. First, the application 310 of the first service server 300 designates the terminal ID and the service ID and transmits a transmission request for the information of the client terminal 100 to an application 220 of the relay server 200 (S701). Upon receiving the request, the application 220 of the relay server 200 makes an information transmission request to application 120 of the client terminal 100 (S702). At this time, the relay server 200 will transmit, together with this request, information designating the service to which the request belongs to the client terminal 100 to notify the client terminal 100 of the type of this service. For example, the relay server transmits the service ID as shown in FIG. 3 to the client terminal 100. Upon receiving the request, the application 120 of the client terminal 100 accesses (S703) the terminal information storage area 110 and reads out (S704), with respect to the designated service, the information of the information block whose transmission is permitted based on the information set in S507. For example, in the information shown in FIG. 5, the client terminal 100 reads out information of a block corresponding to the service ID received in S702. Subsequently, the application 120 of the client terminal 100 transmits the information that has been read out to the application 220 of the relay server 200 (S705). The application 220 of the relay server 200 transfers the received information to the application 310 of the first service server 300 (S706). Similar processes are performed for the application 350 of the second service server 340 (S707 to S712).

As a result, the service server can obtain only the required minimum amount of information from the client terminal 100 in accordance with the service to be provided. In addition, by setting so that only the required minimum amount of information is transmitted, it is possible to prevent an unnecessary increase in communication traffic, suppress the load of the relay server 200, and prevent the occurrence from information leakage.

In addition, in S703, the relay server 200 transmits, to the client terminal 100, information indicating the type of the service instead of transmitting information designating the transmission target information as shown in FIG. 5. That is, at the time of the registration processing shown in FIG. 2, the information shown in FIG. 5 is stored in the client terminal 100, and information to be transmitted from the client terminal 100 is selected based on the information shown in FIG. 5 in the subsequent information transmission processing shown in FIG. 6. Hence, for example, the relay server 200 can transmit information of an amount less than that in a case in which the information shown in FIG. 5 is to be transmitted to the client terminal 100 each time the relay server requests information to the client terminal 100. As a result, it is possible to transmit information corresponding to the service to the client terminal 100 while reducing the communication amount required when requesting information to the client terminal 100.

Note that the specifications of the block formation of information that can be provided in the terminal information storage area 110 may be determined at the stage before the user is to purchase the client terminal 100 such as the time of shipment of the client terminal. Alternatively, it may be determined dynamically when transmission permission/prohibition settings are made. Also, in a case in which a new service is added to an already-existing service, it may be set so that the service server of the new service will be able to set a new information block for the new service in the terminal information storage area 110 via the relay server 200.

Note that although it was described above that a plurality of information elements are to be put together in a single information block, the present invention is not limited to this. That is, the transmission permission/prohibition setting can be made individually for each information element. As a result, it will be possible to make a more detailed setting. On the other hand, since block formation will create a state in which the transmission permission/prohibition information is transmitted on a block basis from the relay server 200 to the client terminal 100, the amount of information exchanged for the transmission permission/prohibition setting can be reduced. Also, by executing block formation, it is possible to reduce the size of the information storage area for the transmission permission/prohibition setting in the terminal information storage area 110.

Dynamic Control of Transmission Permission/Prohibition Setting

The transmission permission/prohibition of the information block set in the above-described manner can be changed dynamically. Such dynamic control will be described hereinafter.

As described in the embodiment described above, the relay server 200 can exchange information based on the request from the client terminal 100 or each service server and perform writing or reading of information with the database 207. It can be assumed that the number of client terminals 100 and the number of service servers will increase or decrease while an already-existing service is in operation, and that the information amount of the exchange or the writing or reading to be performed with the database 207 will also increase or decrease in such a case. For example, if the number of client terminals 100 rapidly increases, the amount of data exchanged via the relay server 200 will increase in accordance with this increase. Hence, the load of each resource of the relay server 200 can change in accordance with the increase or decrease in the number of the client terminals 100 and the number of service servers. If the amount of information to be processed by the relay server 200 exceeds the amount of information that can be processed due to such an increase in the amount of exchanged data, the relay server 200 may not be able to normally provide a service to the client terminal 100. Therefore, the relay server 200 will monitor, for example, the state of the load of the communication traffic that passes the communication module 201 of the self-apparatus and the use state of the CPU 204 or the RAM 203, and dynamically change the transmission permission/prohibition setting of an information block in accordance with the states of these components. For example, the relay server 200 will decrease the amount of information permitted to be transmitted in a heavy load state and will increase the amount of information permitted to be transmitted in a light load state. As a result, the relay server 200 can reduce the load when the load of the self-apparatus or the network is heavy.

Figure 7:
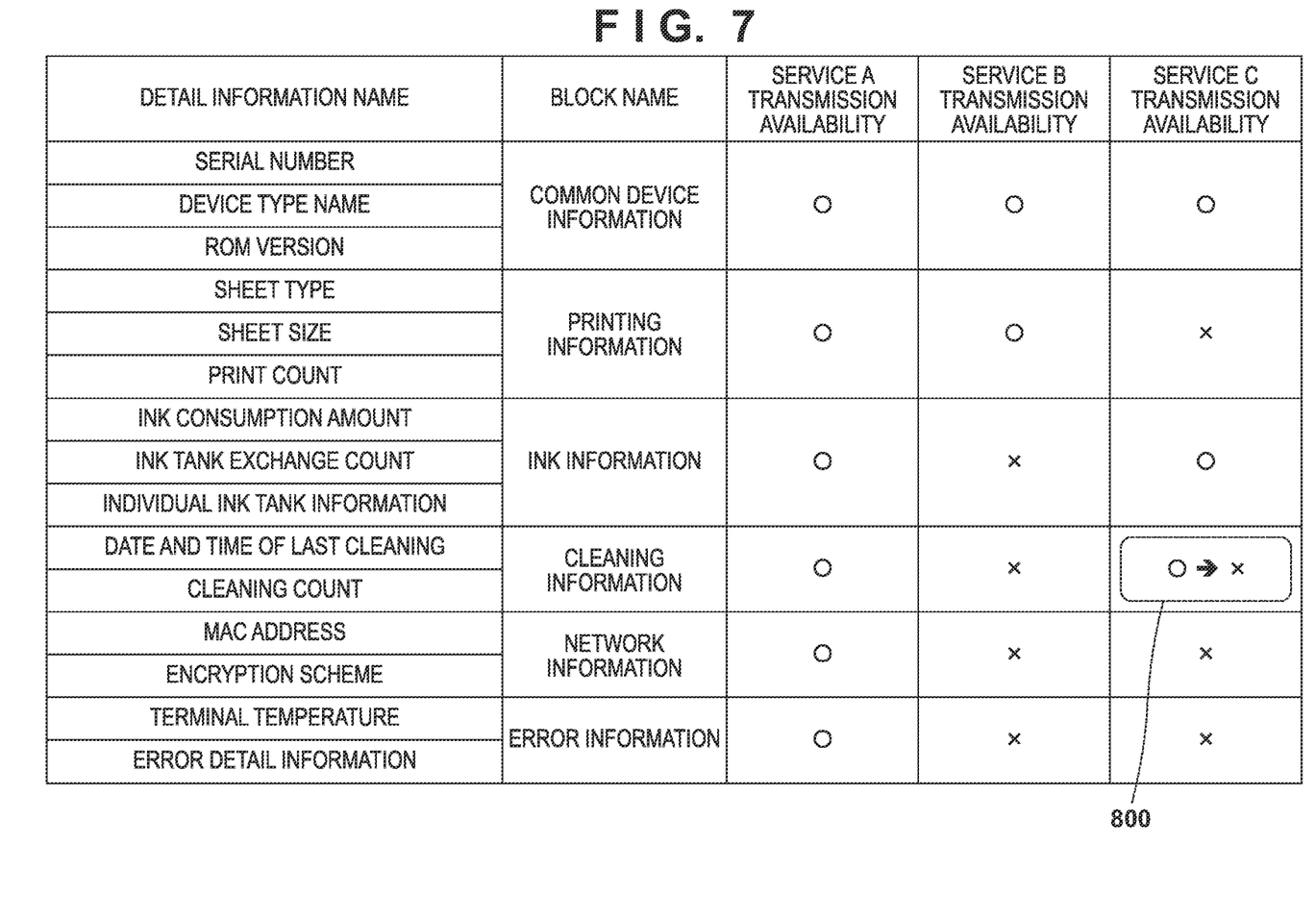
FIG. 7 is a table showing an example of a dynamic change to the transmission permitted information.

For example, in a heavy load state, under a premise that each service should not be stopped in a state in which the service is in operation, the relay server 200 can prevent the transmission of an information block which has the lowest priority among the information blocks to be provided to each service server providing a service. More specifically, as shown in FIG. 7, of the transmission permission/prohibition settings stored in the terminal information storage area 110, a piece of cleaning information 800 in which a transmission permission setting has been set in relation to the service C is changed to a transmission prohibition setting. This is because the cleaning information is of relatively low in importance for the automatic ink delivery service. Note that the relay server 200 can share this setting change information to the client terminal 100, and the client terminal 100 can accordingly operate so as not to provide the cleaning information 800 in subsequent processes. As a result, the relay server 200 can reduce the amount of traffic that it relays. At this time, the relay server 200 may notify the service server which provides the service C that the cleaning information will not be transmitted.

Figure 8:
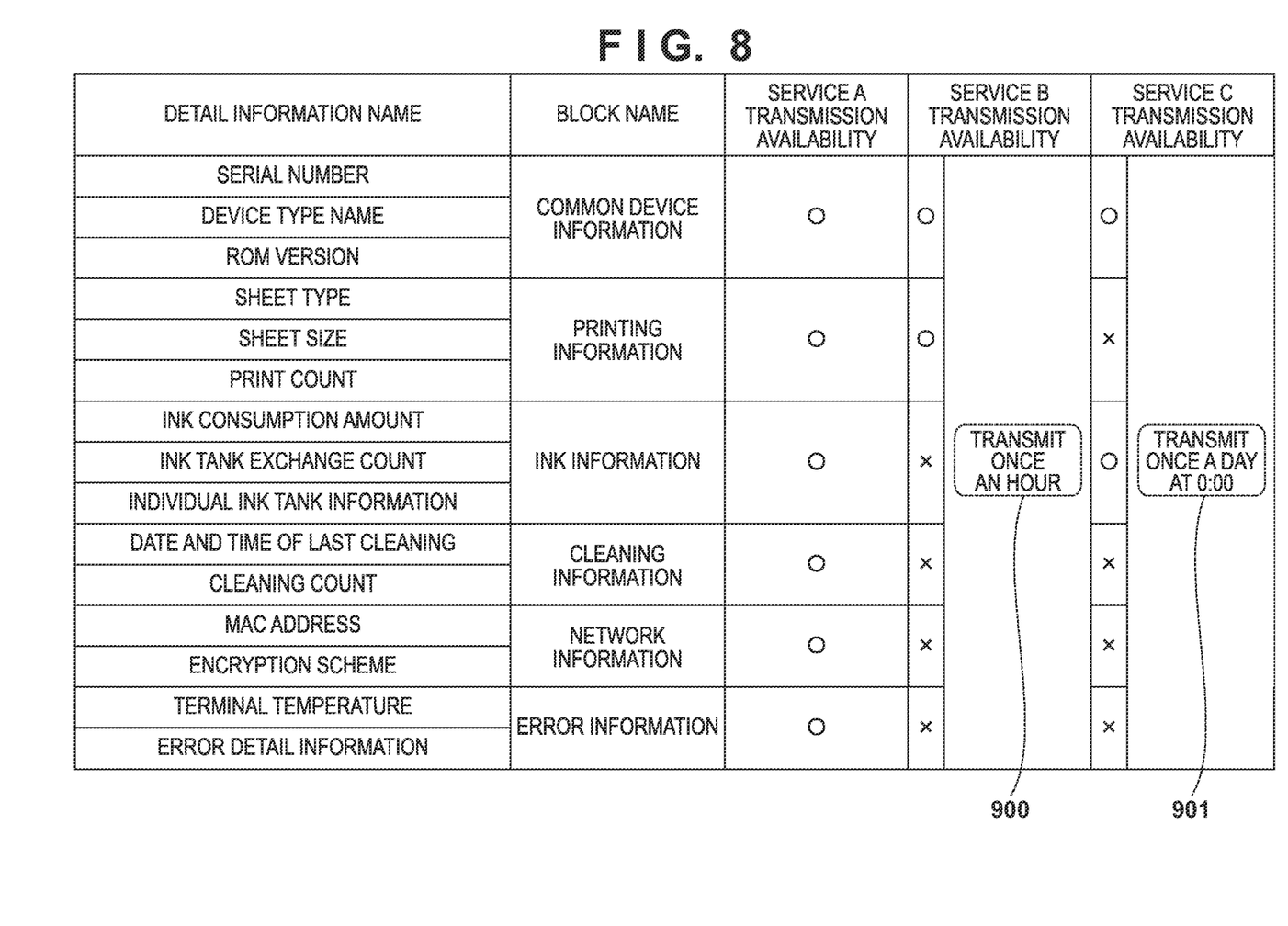
FIG. 8 is a table showing an example of transmission settings of the transmission permitted information.
Figure 9:
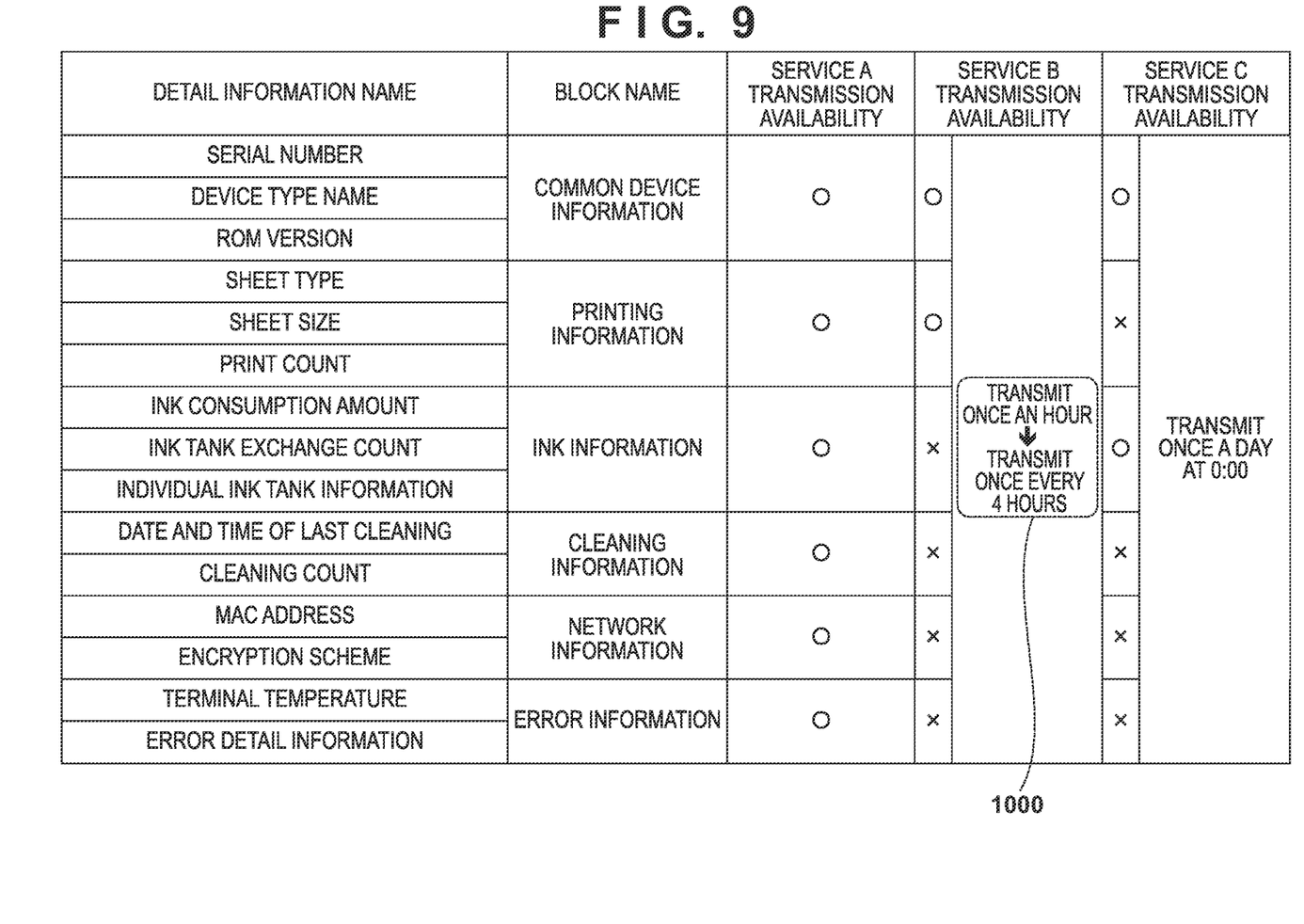
FIG. 9 is a table showing an example of a dynamic change to the transmission settings of the transmission permitted information.

In addition, in a heavy load state, under a premise that each service should not be stopped, the relay server 200 can cause information to be provided from the client terminal 100 to a service server at each predetermined time, regardless of a request from the service server. That is, instead of transferring a request from the service server and causing the client terminal 100 to provide the information each time, the relay server 200 causes the client terminal to provide information at a long predetermined cycle to reduce the load. For example, since the service B is a service that provides another service to the user depending on the number of printed sheets, and the service C is a service that automatically delivers ink to the user by detecting that the ink has been depleted, it can be said that immediacy is not important for both of these services. Hence, in a case in which a heavy load state is detected, the relay server 200 will stop the processing which causes the client terminal 100 to provide information in response to a request from each service server, and will change the setting so that the information will be provided once an hour to the service B as shown by reference numeral 900 in FIG. 8. In a similar manner, the relay server 200 will change the setting so that information will be provided to the service C once a day at 0:00 a.m. as shown by reference numeral 901 in FIG. 8. Also, in a case in which a heavy load state continues, the relay server 200 may further reduce the frequency of information provision as shown by reference numeral 1000 in FIG. 9. Note that the relay server 200 need not share this setting change with the client terminal 100. This is because the relay server 200 can reduce the information provision count by controlling the request transfer operation from the service server to the client terminal 100 based on this setting change without any changes in the settings of the client terminal 100. The relay server 200 may also share this setting change with the client terminal 100. This will prevent unnecessary information from being provided based on the changed settings even in a case in which a received signal is misinterpreted as an information provision request signal.

In this manner, the relay server 200 can monitor the state of load of the self-apparatus or the network and dynamically change the settings, the transmission frequency, and the like of each information block that is to be provided by the client terminal 100. As a result, in case in which a heavy load state is detected, the relay server 200 can reduce the load and stabilize the operation of the information processing system. This will also allow the user to stably receive a desired service via the client terminal 100.

Note that although an example of a standard for dynamically setting a prohibition on the transmission of an information block has been given here, the transmission permission/prohibition setting may be made dynamically based on a standard other than this. That is, the transmission permission/prohibition setting may be made dynamically based on various kinds of standards such as an arbitrary standard set by a service provider or an operator of the relay server 200. Also, although one information block is changed from a transmission permitted state to a transmission prohibited state in the example described above, a plurality of information blocks may be changed to the transmission prohibited state. In addition, in a case in which it is detected that state of the load has been reduced, the relay server 200 may change each information block, which has been set to the transmission prohibited state, to the transmission permitted state. In this case, the standard used to determine which information block can be set to the transmission permitted state will is not particularly limited. Furthermore, the dynamic changes to the information provision settings and the dynamic changes to the information provision frequency described above may be combined. For example, although FIG. 7 described an example in which some of the information elements are set to an information provision prohibited state temporarily, it may be set so that the information provision frequency of only some of the information elements is suppressed such as setting the information provision of the some of the information elements to be performed once a day or the like.

Note that a "heavy load" state as described above can be a predetermined state such as, for example, a state in which usage rate of the CPU 204 or the RAM 203 of the relay server 200 exceeds a predetermined value, a state in which the ratio of the maximum throughput of the communication module 201 to the current throughput exceeds a predetermined value, or the like. In addition, a heavy load state can be determined in a case in which the communication ratio probability of the communication module 201 exceeds a predetermined value, a case in which the probability that the retransmission count will exceed a predetermined count has exceeded a predetermined value, or the like. Other than these states, a heavy load state can be determined in a predetermined state in which an arbitrary measurement value, which indicates a high value as the load is heavier, exceeds a predetermined value. Furthermore, although it has been described above that the relay server 200 will dynamically change the information provision or the information provision frequency in response to the network or the self-apparatus changing to the heavy load state, it may be set so that these settings will be dynamically changed in a case in which a standard other than the heavy load state is satisfied.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-144024, filed Jul. 31, 2018 which is hereby incorporated by reference herein in its entirety.

What is claimed is:

1. A relay apparatus that relays communication between a server which provides a service and a terminal which receives the service, the apparatus comprising:
   at least one processor;
   wherein the at least one processor transmits to the terminal a first request to set, in the terminal, a piece of transmission target information for each of a plurality of services; and
   the at least one processor notifies the terminal of a predetermined service of a plurality of services if a second request corresponding to the predetermined service of the plurality of services is received from the server after the at least one processor transfers the first request,
   wherein in a case where the predetermined service is notified by the second request to the terminal in which the piece of transmission target information has been set, the terminal transfers the piece of transmission target information set for the notified predetermined service, among a plurality of pieces of information that can be provided by the terminal, and the at least one processor receives the piece of transmission target information transferred from the terminal, and transfers the piece of transmission target information to the server.

2. The apparatus according to claim 1, wherein the plurality of pieces of information is divided into a plurality of blocks each of which includes at least one piece of information of the plurality of pieces of information, and the setting indicates whether information is to be transmitted from the terminal for each block.

3. The apparatus according to claim 2, wherein the plurality of blocks include a block of information, wherein the block is related to the terminal and is notified commonly for the plurality of services.

4. The apparatus according to claim 2, wherein the plurality of blocks include a block of information unique to hardware of the terminal and a block of use history information of a user of the terminal.

5. The apparatus according to claim 1, wherein, based on the first request, the terminal sets information associating a service to be provided via the relay apparatus with information requested in the service.

6. The apparatus according to claim 5, wherein the relay apparatus stores first information in which a terminal whose communication is to be relayed by the relay apparatus is registered and second information which associates the service to be provided via the relay apparatus with the terminal which is to receive the service, and in a case in which the terminal registered in the first information is registered in the second information, the at least one processor causes the terminal to set, as the setting by the first request, information which is requested in a service associated with the terminal in the second information.

7. The apparatus according to claim 1, wherein the at least one processor dynamically changes the setting in the terminal.

8. The apparatus according to claim 7, wherein the at least one processor dynamically changes the setting in accordance with a load of the relay apparatus or a load of a network between the relay apparatus and the terminal or the server.

9. The apparatus according to claim 8, wherein in a predetermined state in which the load is heavy, the at least one processor changes the setting so as to decrease the number of pieces of information to be transmitted.

10. The apparatus according to claim 8, wherein in a predetermined state in which the load is heavy, the at least one processor changes the setting so as to reduce a transmission frequency of information to be transmitted.

11. The apparatus according to claim 10, wherein in a case in which the at least one processor has reduced the transmission frequency, the at least one processor will transmit, regardless of the second request from the server, the first request to the terminal based on the changed setting, and cause the terminal to transmit information based on the setting.

12. The apparatus according to claim 1, wherein the terminal is an inkjet printing apparatus, and the piece of transmission target information includes at least one of information of history of printing performed by the printing apparatus, information of ink used by the printing apparatus, and information of cleaning an inkjet printhead of the printing apparatus.

13. The apparatus according to claim 1, wherein the at least one processor transmits the first request to the terminal, based on that a third request is received from the server.

14. The apparatus according to claim 13, wherein the third request is a request for associating the terminal and the service in the relay apparatus.

15. The apparatus according to claim 1, wherein the at least one processor executes the transmission of the first request, for each of the predetermined service by the server and another service by another server among the plurality of services.

16. A control method for a relay apparatus that relays communication between a server which provides a service and a terminal which receives the service, the method comprising:

transmitting to the terminal a first request to set, in the terminal, a piece of transmission target information for each of a plurality of services; and notifying the terminal of a predetermined service of a plurality of services, if a second request corresponding to the predetermined service of the plurality of services is received from the server after the at least one processor transfers the first request, wherein in a case where the predetermined service is notified by the second request to the terminal in which the piece of transmission target information has been set, the terminal transfers the piece of transmission target information set for the notified predetermined service, among a plurality of pieces of information that can be provided by the terminal, the method further comprising receiving the piece of transmission target information transferred from the terminal, and transferring the piece of transmission target information to the server.

17. An information processing system that includes a terminal which receives a service provided by a server and a relay apparatus which relays communication between the server and the terminal, wherein the relay apparatus comprises at least one first processor executing:

transmitting to the terminal a first request to set, in the terminal, a piece of transmission target information for each of a plurality of services, and notifying the terminal of a predetermined service of a plurality of services, if a second request corresponding to the predetermined service of the plurality of services is received from the server after the first request is transferred, and the terminal comprises at least one second processor executing:

transmitting, in a case where the predetermined service is notified by the second request to the terminal in which the piece of transmission target information has been set, the piece of transmission target information set for the notified predetermined service, among a plurality of pieces of information that can be provided by the terminal wherein, the at least one first processor receives the piece of transmission target information transferred from the terminal, and transfers the piece of transmission target information to the server.

18. The system according to claim 17, wherein the plurality of pieces of information is divided into a plurality of blocks each of which includes at least one piece of information of the plurality of pieces of information, and the setting indicates whether information is to be transmitted from the terminal for each block.

19. The system according to claim 17, wherein, based on the first request, the at least one second processor sets information associating a service to be provided via the relay apparatus with information requested in the service.

20. The system according to claim 19, wherein the relay apparatus stores first information in which a terminal whose communication is to be relayed by the relay apparatus is registered and second information which associates the service to be provided via the relay apparatus with the terminal which is to receive the service, and
   in a case in which the terminal registered in the first information is registered in the second information, the at least one first processor causes the terminal to set, as the setting by the first request, information which is requested in a service associated with the terminal in the second information.

21. The system according to claim 17, wherein the at least one first processor dynamically changes the setting in the terminal.

22. The system according to claim 21, wherein the at least one first processor dynamically changes the setting in accordance with a load of the relay apparatus or a load of a network between the relay apparatus and the terminal or the server.

23. The system according to claim 17, wherein the terminal is an inkjet printing apparatus, and
   the piece of transmission target information includes at least one of information of history of printing performed by the printing apparatus, information of ink used by the printing apparatus, and information of cleaning an inkjet printhead of the printing apparatus.

* * * * *